United States Patent [19]

Nagumo et al.

[11] 4,345,270
[45] Aug. 17, 1982

[54] SOLID STATE DIGITAL TELEVISION CAMERA

[75] Inventors: Fumio Nagumo, Yokohama; Takashi Asaida, Atsugi, both of Japan

[73] Assignee: Sony Corporation, Tokyo, Japan

[21] Appl. No.: 228,981

[22] Filed: Jan. 27, 1981

[51] Int. Cl.³ .............................................. H04N 9/07
[52] U.S. Cl. ..................................................... 358/44
[58] Field of Search .................................. 358/43, 44

[56] References Cited

U.S. PATENT DOCUMENTS 4,227,206 10/1980 Nagumo ............................... 358/44

Primary Examiner—Robert L. Richardson
Attorney, Agent, or Firm—Hill, Van Santen, Steadman, Chiara & Simpson

[57] ABSTRACT

A solidstate digital television camera which has a solid state image sensing device, an A-D converter for converting the output of the image sensing device to a digital color signal, a filter for providing a predetermined filter characteristic to the digital color signal, and a digital color modulator for modulating the output of the above filter to produce a digital modulated signal.

In the digital television camera, the processing rate between the solid state image sensing device and the filter is selected to have a sampling rate equal to that of the solid state image sensing device, or $(n/m)pF_{sc}$ where $f_{sc}$ is a color subcarrier frequency, p is 3 or 4, and m and n are relatively small integers. The processing rate for the remaining elements is selected to be $pf_{sc}$. In addition, a D-D converter for converting the processing rate from $(n/m)pF_{sc}$ to $pf_{sc}$ is provided between the filter and the digital modulator. Thus, the digital television camera can be operated at a relatively slow sampling drive rate and can be constructed from integrated circuits.

8 Claims, 16 Drawing Figures

SOLID STATE DIGITAL TELEVISION CAMERA

BACKGROUND OF THE INVENTION

1. Field of the Invention

This invention relates to a television camera using a solid state image sensing device such as a charge coupled device for producing a color television signal and in which digital processing is performed.

2. Description of the Prior Art

A color television camera has been proposed in which an image pickup output (an analog signal) derived from the solid state image sensing device is subjected to a digital intermediate process and a standard analog color television signal is finally produced. As compared with another conventional color television camera in which a color television signal is analog-processed over the whole signal process interval, the aforesaid color television camera is particularly superior in signal processing, circuit construction, and reliability. Accordingly, so as to interface with other digital equipments, it is desirable to use digital signal processing in color television cameras.

In using digital-processing of the image pickup output for producing a color television signal, the processing rate for producing a digital modulated color signal is normally selected to have a frequency which is three or four times the color subcarrier frequency $f_{sc}$. This is because the color subcarrier frequency is $f_{sc}$ in the standard color television signal, as well as the band width of the video signal, and for easy processing of the signal when the video signal is considered as two-dimensional sampling system.

Accordingly, when $3f_{sc}$ or $4f_{sc}$ is selected as the frequency of a reference clock, circuit systems for digital signal processing must be all driven at a rate of $3f_{sc}$ or $4f_{sc}$, for example, the frequency of the driving pulses for driving a solid state image sensing device, the sampling rate of a sampling pulse for sampling-holding the output of the solid state image sensing device, the processing rate for converting the image sensing output from its analog form to digital form, and the like. However, if such reference clock frequency is used for processing in the circuit system, the frequency will exceed 10 MHz which increases the processing speed higher than it need be in the circuit system. Further, if a cut-off frequency is constant as in digital filters used for limiting the frequency band of a color signal, for example, the number of delay elements or the like used in such digital filters increase proportional to the processing rate and a digital processing circuit having many components would be required resulting in high cost and complicated integrated circuits.

SUMMARY OF THE INVENTION

Accordingly, an object of this invention is to provide a solid state digital television camera in which the number of digital processing circuits which use the frequency of the reference clock is made as small as possible while circuits that can use lower frequencies than that of the reference clock are utilized thus resulting in simpler and cheaper integrated circuits. Thus, in this invention the sampling rate for driving the solid state image sensing device is such that it utilizes a frequency lower than that of the reference clock. Therefore, processing circuits having lower processing rates are increased in number and circuits requiring uneven processing rates are interposed between such circuits using digital to digital converters for coupling them together.

An additional object of the invention is to provide a solid state digital television camera in which the outputs of an image sensing device using a charge coupled device for producing discrete image pickup signals are processed using digital circuits and then converted to a standard television signal and which provides a video output which has less signal deterioration than cameras of the prior art and wherein the temperature drift, secular variation and noise is reduced.

Other objects, features and advantages will become apparent from the following description of certain preferred embodiments thereof taken in conjunction with the accompanying drawings although variations and modifications may be effected without departing from the spirit and scope of the novel concepts of the disclosure, and in which:

DETAILED DESCRIPTION OF THE PREFERRED EMBODIMENTS

Figure 1:
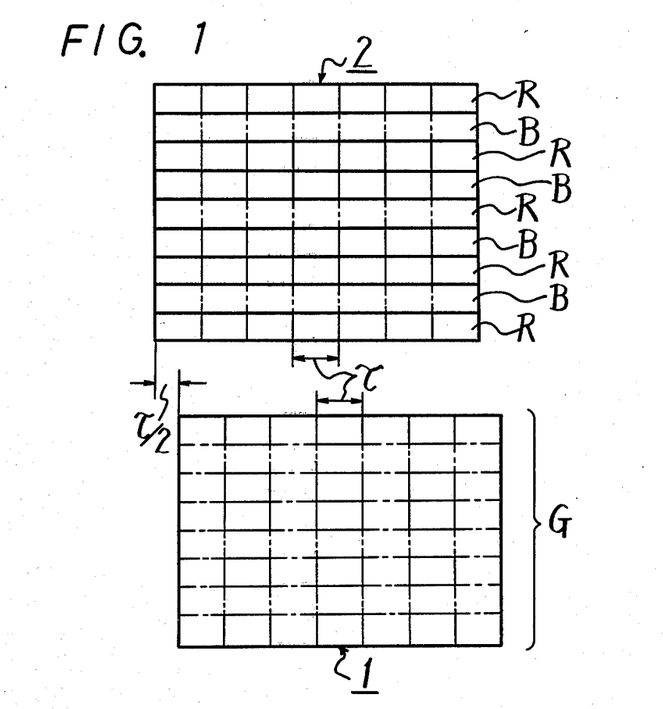
FIG. 1 illustrates the spatial relationship between two solid state image sensing devices.

FIG. 1 illustrates a color television camera using a charge coupled device (CCD) as the image sensing device. The embodiment of the sensing device illustrated in FIG. 1 uses a two-chip type color television camera in which one CCD 1 provides a green signal G from its entire surface and the other CCD 2 provides red and blue signals alternately in a line sequential manner as illustrated in FIG. 1. So as to prevent aliasing noise from being generated and to improve the resolution in the horizontal direction, the spatial sampling phase between CCDs 1 and 2 is shifted by $\tau/2$ where $\tau$ is a pitch space adjustment of the picture elements in the horizontal direction as illustrated in FIG. 1.

Figure 2:
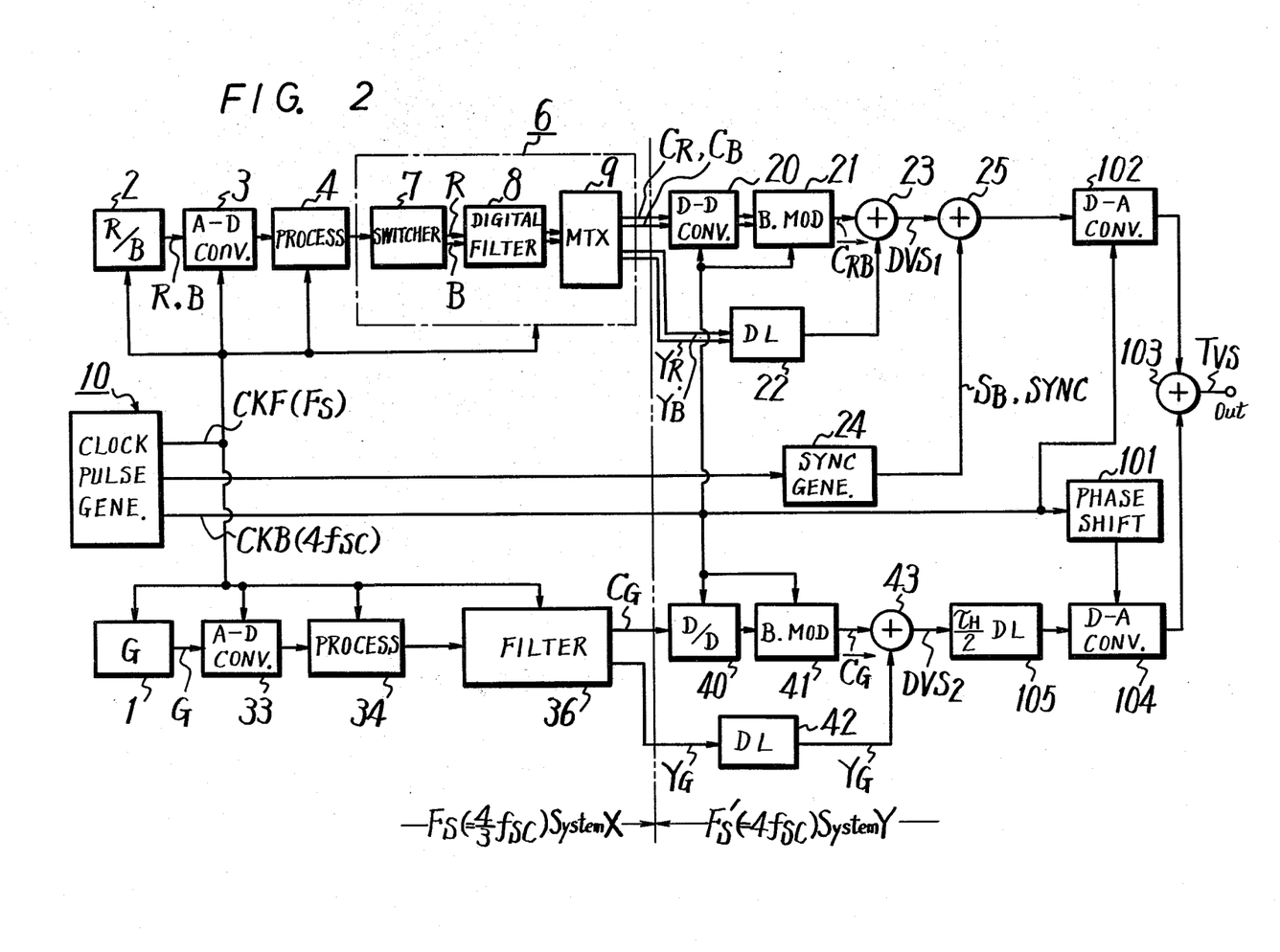
FIG. 2 is a block diagram illustrating one example of the invention.

FIG. 2 comprises a block diagram illustrating the CCDs 1 and 2 of the image pickup output wherein the red and blue signals R and B from CCD chip 2 is first converted to a first sample 8-bit digital signal or a word signal by analog to digital (A-D) converter 3 and then supplied to a signal processing circuit 4 for signal processing. Since the input signal of the A-D converter 3 which is the output of the CCD chip 2 has already been sampled by the CCD drive clock, the A-D converter 3 need only function such as to quantitize the output of the CCD chip 2. The signal processing includes a process for gamma (γ) correction, white clip, pedestal clamp and so forth.

The output of the processor 4 is supplied to a filter device 6 which consists of a simultaneous circuit 7 for producing line sequential signals in a simultaneous form and which supplies an output to a digital filter 8 for obtaining the desired filter characteristics and supplies its output to a matrix circuit 9. The matrix circuit 9 produces band limited digital color signals such as red signal $C_R$, blue signal $C_B$ as well as digital luminance signals $Y_R$ and $Y_B$. The filter 8 is a two dimensional spatial filter which is used to eliminate aliasing noise caused by the line sequential television system. The filter 8 also accomplishes band limiting for luminance signal components and color signal components and also accomplishes vertical aperture correction.

The signal processing system between the CCD chip 2 and the filter device 6 uses a sampling rate for processing which is the same as the sampling rate of the CCD 2. In this particular example, the sampling rate of the CCD 2 is selected to be $(4/3)f_{sc}(=F_S)$ and thus the A-D converter 3, the processing circuit 4 and the filter device 6 all operate to process at a sampling rate of $(4/3)f_{sc}$. A clock pulse CKF at this sampling rate is supplied from the clock pulse generator 10 as illustrated in the Figure. The digital processing circuits subsequent to the filter device 6 will process signals at a clock pulse CKB which equals $3f_{sc}$ or $4f_{sc}$.

The digital color signals $C_R$ and $C_B$ are supplied from the matrix circuit 9 to a digital to digital (D-D) converter 20 where the digital color signals $C_R$ and $C_B$ which have been processed at the sampling rate of $(4/3)f_{sc}$ are converted into digital color signals $C_R$ and $C_B$ at a sampling rate of $4f_{sc}$. The converted digital color signals $C_R$ and $C_B$ are supplied from the converter 20 to a digital color modulator 21 where they are converted by modulation to, for example, a two phase quadrature signal. The modulated digital color signal $\vec{C}_{RB}$ $(=\vec{C}_R+\vec{C}_B)$ is fed from modulator 21 to a digital adder or mixer 23 where it is mixed with the digital luminance signal $Y_R$ or $Y_B$ which has been delayed for a predetermined time by passing it from the matrix 9 through a digital delay circuit 22. At the output of the adder 23, a digital video signal $DVS_1$ will be derived.

At the same time, a digital synchronizing signal generator 24 receives a pulse from the generator 10 and produces a digital burst signal $S_B$ and a composite synchronizing signal SYNC, which are added to the digital video signal $DVS_1$ in the adder or mixer 25. The digital video signal $DVS_1$ is then converted into an analog signal in a digital to analog (D-A) converter 102 and the analog signal thus formed is supplied to an adder or mixer 103.

The green signal G derived from the CCD 1 is also subjected to a similar digital processing through an analog to digital converter 33, a signal processing circuit 34, a filter device 36, a digital to digital converter 40, a digital color modulator 41 to obtain a modulated digital signal $\vec{C}_G$. The signal $\vec{C}_G$ is fed to an adder or mixer 43 where it is added to a digital luminance signal $Y_G$ from a digital delay circuit 42 which receives an input from the filter 36. The output of the adder 43 is a digital video signal $DVS_2$. The digital video signal $DVS_2$ is supplied through a τH/2 digital delay line 105 and a digital to analog converter 104 and then to the adder 103 where it is added to the digital video signal $DVS_1$ so as to produce a standard analog television signal TVS. In the green channel, the filter device 36 does not require a simultaneous circuit as in the upper channel. The τH/2 digital delay line 105 following the mixer 43 corrects the time difference between the digital video signals $DVS_1$ and $DVS_2$ which results from the offset of τ/2 of the picture element of the CCD chips 1 and 2 as illustrated in FIG. 1 such that the modulation axis advanced in phase at the digital color modulator 41 is restored so that they are coincident with the spatial sampling phase of the green signal G. When the red and blue signals R and B have the same spatial sampling phase as the green signal G the digital delay line 105 is not required.

Figure 3:
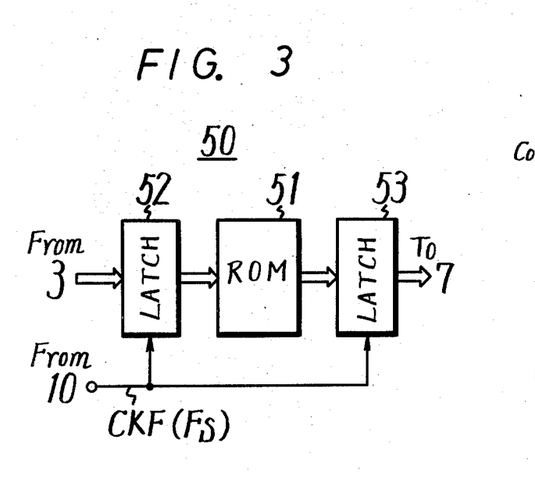
FIG. 3 is a block diagram illustrating the gamma correction circuit.
Figure 4:
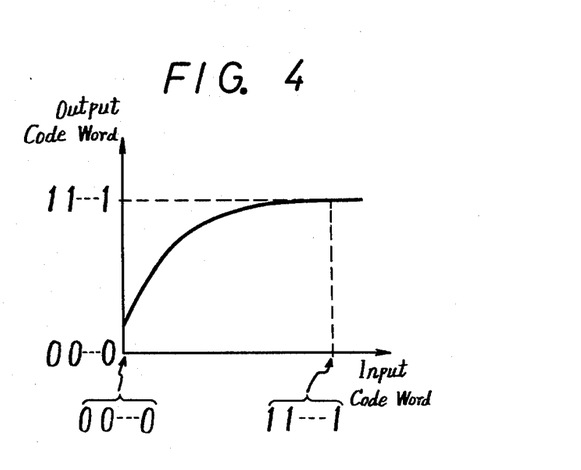
FIG. 4 is a graph for explaining the operation of the circuit of FIG. 3.

The specific details of the other circuits illustrated in FIG. 2 are shown in other Figures and will be described in detail hereafter. A digital γ-correction circuit 50 which is provided in the signal processing circuit 4 is illustrated in FIG. 3. The digital γ-correction circuit 50 consists of a read-only memory (ROM) 51 which is used as a lock-up table and includes the latch circuits 52 and 53 which are respectively placed at the input and output sides of the ROM 51. The ROM 51 stores a γ-corrected output code word corresponding to an input code word as illustrated in FIG. 4. Thus, an 8-bit 1-word input code word which is the latch output is applied to the ROM 51 to address it so that the addressed code word is read out. The latch circuits 52 and 53 are driven by the same clock pulse CKF and thus low speed elements may be used for this structure. Also, the ROM 51 has an input and an output ratio of 1:1 so it can be constructed with relatively simple logic circuits.

Figure 5:
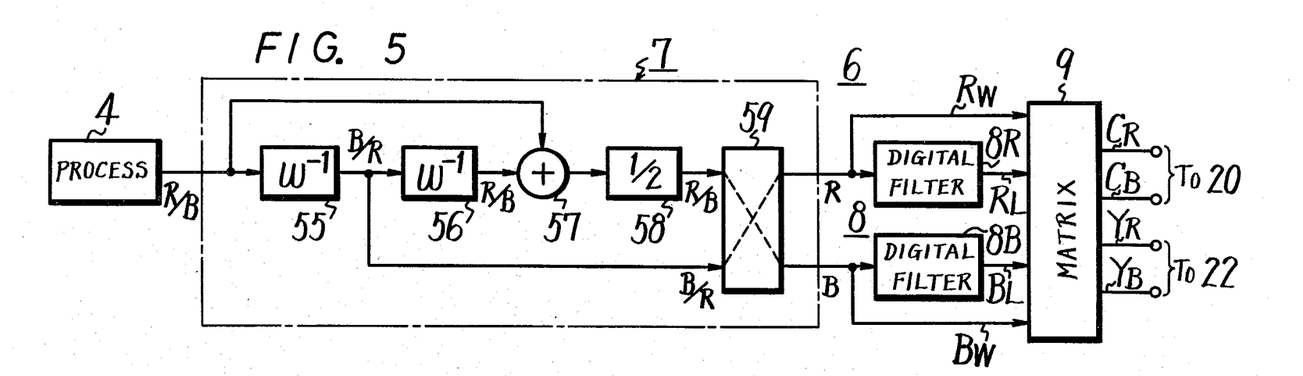
FIG. 5 is a block diagram showing a filter of the invention.

FIG. 5 illustrates the filter device 6 in which the simultaneous circuit or switcher 7 includes a pair of cascade connected delay elements 55 and 56 each of which have a delay time of 1H and supply output to an adder 57 which is connected to an attenuator 58. The digital color signals R or B from the signal processing circuit 4 and the signal which has been delayed by 2H through the delay circuits 55 and 56 are added together in the adder 57 and the added output is fed to the attenuator 58 where the level of the added signal is attenuated to $\frac{1}{2}$ so as to perform vertical interpolation based on the outputs of two horizontal lines with respect to the same color signal. This two dimensional spatial filter which acts as the vertical interpolator for accomplishing this result has the following transfer function H (v).

$$H(v) = [1 + \tfrac{1}{2}(\omega^{-1} + \omega)]$$

where $\omega^{-1}$ is a delay element for two scanning lines in the vertical direction. A switching circuit 59 receives the output of the attenuator 58 as well as the output of the delay line 55 and accomplishes switching at every line interval (1H) so as to obtain simultaneous mode of the line sequential digital color signals.

The digital color signals R and B are simultaneously arranged by the switching circuit 59 and/or respectively applied to digital filters 8R and 8B so as to provide the desired filtered characteristics. The digital filters 8R and 8B may be transversal type digital filters having symmetrical impulse response so as to provide stabilized processing and constant group delay characteristics.

Figure 6:
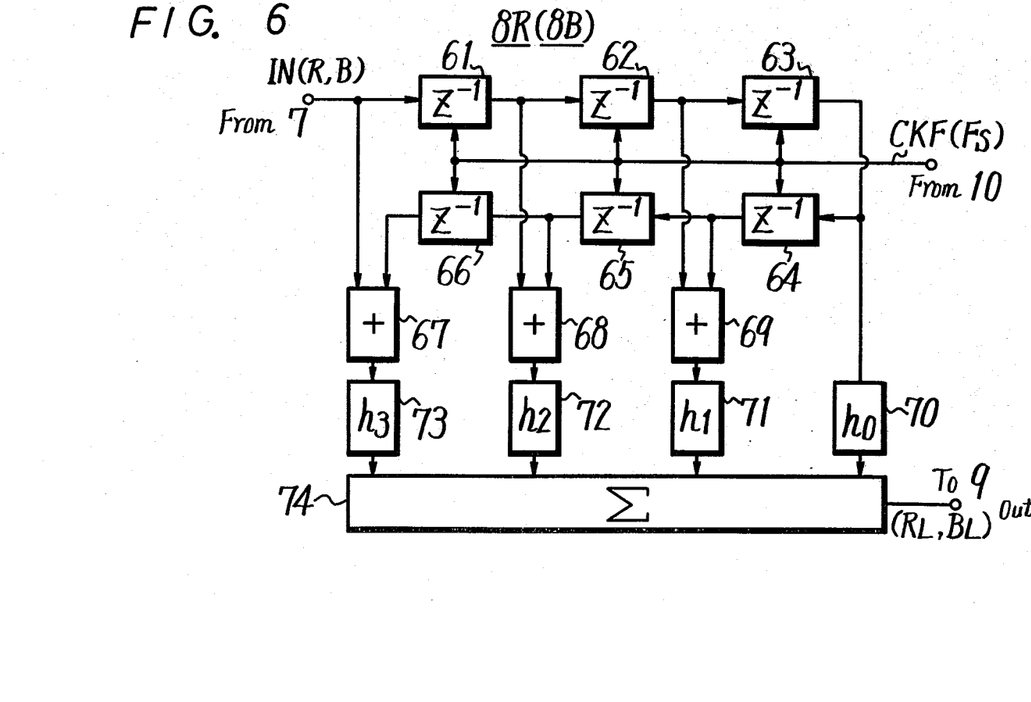
FIG. 6 is a block diagram illustrating a digital filter of the invention.

FIG. 6 illustrates an example of the digital filter 8R or 8B. The example comprises a septenary digital filter formed as a low pass filter in which six delay operators 61 through 66 connected as shown and each having a delay of $1/F_S$, are connected in series. An output as, for example, from the delay operator 63 and outputs from three adders 67 through 69 are supplied through elements 70 through 73 having impulse response coefficients of $h_0$ through $h_3$ to an adder 74 to derive a digital color signal $R_L$ or $B_L$ which has a frequency band limited to about 800 KHz.

The operators 61 through 66 are supplied with the clock pulse CKF from the generator 10 and the delay time in the horizontal direction is $1/F_S$, so that the processing can be accomplished at low speeds. The filter having the above described construction also has constant group delay characteristics and also there is no delay error between the R or B channel and the G channel. The other digital filter 8B is constructed in the same manner as the filter illustrated in FIG. 6 and its description is not required.

As shown in FIG. 5, the band-limited digital color signals $R_L$ and $B_L$ from the digital filters 8R and 8B are supplied to the matrix circuit 9 together with band-unlimited digital color signals $R_W$ and $B_W$ so that the digital luminance signals $Y_R$ and $Y_B$ shown below are produced:

$Y_R = 0.30\ R_L + 0.25\ R_H$ $Y_B = 0.11\ B_L + 0.25\ B_H$ where $R_H$ and $B_H$ are high frequency components of the digital color signals $R_W$ and $B_W$.

The digital color signals $R_L$ and $B_L$ which are expressed as $C_R$ and $C_B$, will be supplied to the digital to digital analog converter 20 and subjected to a rate conversion process. The digital to digital conversion is a form of interpolation so that the processing rate of $F_S = (4/3)f_{sc}$ can be converted to $F_S' = 4f_{sc}$ by interpolating two samples between respective samples of the digital color signal $C_R$ or $C_B$.

Figure 7:
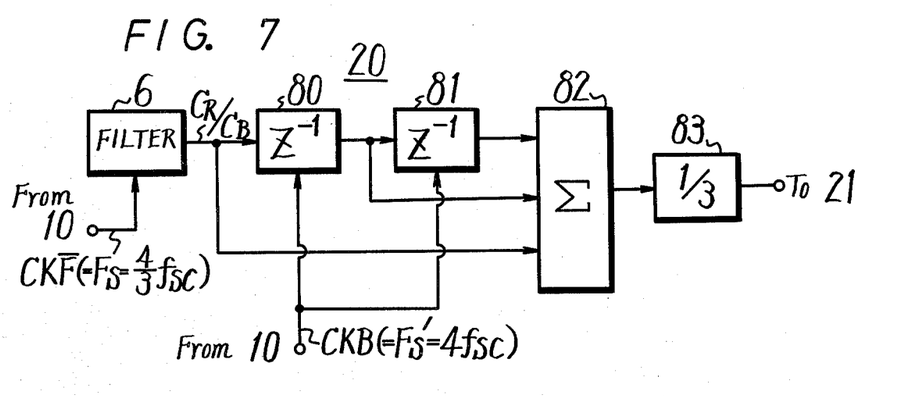
FIG. 7 is a block diagram illustrating a digital to digital converter of the invention.

FIG. 7 illustrates one example of the digital to digital converter 20 in which rate conversion is accomplished by interpolation using linear approximation. Each of the delay operators 80 and 81 comprising D-type flip-flops are driven by the clock pulse CKB having a frequency of $4f_{sc}$ and provide the delay of $\frac{1}{4}f_{sc}$. The delay operators 80 and 81 are connected in cascade manner as shown and the output from each of the operators 80 and 81 as well as the output of the filter 6 are supplied to an adder 82. The output from the operator 81 has been delayed by $$\frac{1}{2f_{sc}}$$

and the output of the operator 80 has been delayed by $$\frac{1}{4f_{sc}}.$$

The added outputs from the adder 82 is fed to a level shift circuit 83 where its level is lowered to $\frac{1}{3}$ of what it previously was.

By performing the above signal processing, two samples are newly interpolated between two original samples at a period of $$\frac{1}{4f_{sc}}$$

so that the conversion of the process rate is accomplished and an interval between two original samples is approximated to a straight line.

After matching the processing rate, the digital color signals $C_R$ and $C_B$ are subjected to balanced modulation in the digital modulator 21 so as to provide the modulated digital color signal $\vec{C}_{RB}$. Thus, in this particular example, the signal is converted to a two phase quadrature modulation signal.

Figure 8:
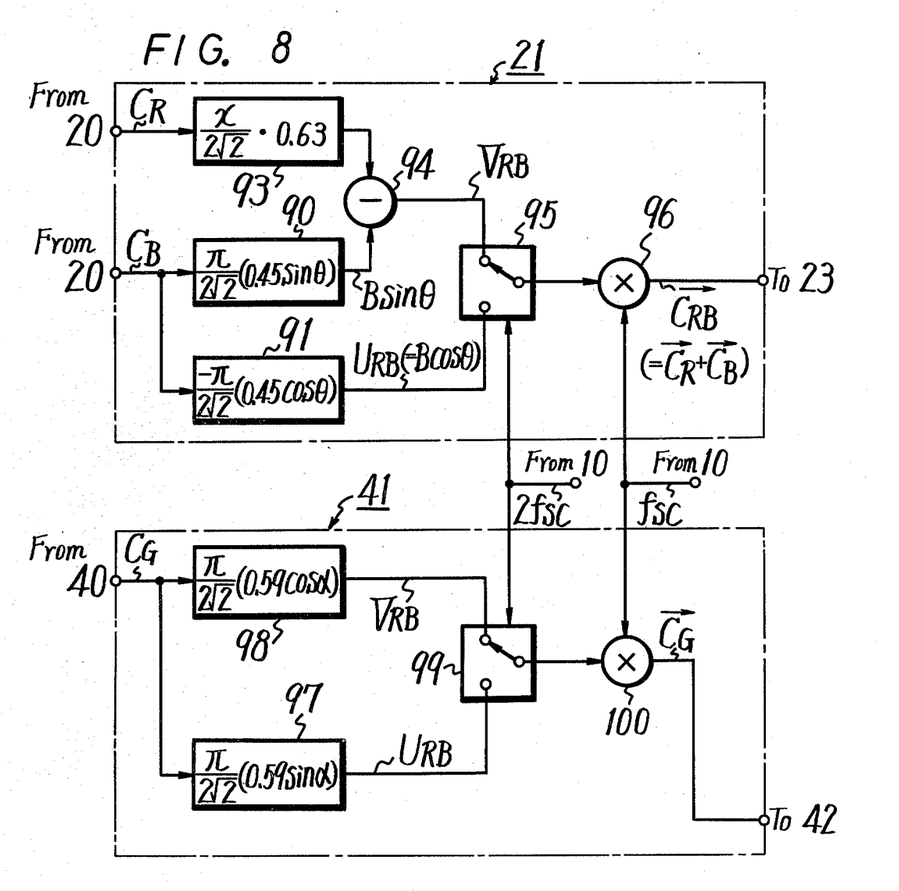
FIG. 8 is a block diagram illustrating digital modulators used in the invention.

Thus, the digital color signals $C_R$ and $C_B$ are resolved into two components with one component $V_{RB}$ in-phase with the R-axis and the second component $U_{RB}$ aligned with the quadrature axis. FIG. 8 illustrates the balanced modulators 21 and 41 in which the digital color signal $C_B$ is supplied to a circuit 90 so as to derive a color component Bsin$\theta$ which is in-phase with the R-axis where B is the level of a color signal and $\theta$ is an angle between the vector $\vec{B}$ of this color signal $C_B$ and the quadrature axis $U_{RB}$ as illustrates in FIG. 9A. In the example illustrated $\theta$ is about 30°. The circuit 90 also performs suitable level adjustment of the color component. Similarly, the digital color signal $C_B$ is fed to another circuit 91 so as to derive a color component Bcos$\theta$ on the quadrature axis $U_{RB}$ after being suitably adjusted in level.

The digital color signal $C_R$ is adjusted in level in a circuit 93 and then supplied to a subtractor 94 together with the output of the circuit 90 so as to derive a color component (R-Bsin$\theta$) on the R-axis or $V_{RB}$-axis. The in-phase component $V_{RB}$ and the quadrature component $U_{RB}$ are alternately obtained every $\frac{1}{2}f_{sc}$ by a switching circuit or data multiplexer 95 and are then supplied to a multiplier or sign inverter 96. The sign inverter 96 is supplied with a carrier $f_{sc}$ from the clock pulse generator 10 and performs multiplication of $-1$ during the former half of the carrier period and multiplication of $+1$ during the second half of the carrier period so that the components $V_{RB}$ and $U_{RB}$ are subjected to a quadrature 2-phase modulation.

The digital color modulation 41 provided in the green signal system is constructed as a balance modulator. The digital color signal $\vec{C}_G$ is supplied to circuits 97 and 98 where it is converted to a quadrature component $U_{RB}$ and an in-phase component $V_{RB}$. These components are switched at a frequency of $2f_{sc}$ at a data multiplexer 99 and are then multiplied with the carrier $f_{sc}$ at a multiplier or sign inverter 100 so as to provide a digital modulated signal $\vec{C}_G$ which has been subjected to quadrature modulation. This circuit will be described subsequently with reference to the modulator 41 illustrated in FIG. 8 and FIG. 9B.

Figure 9A:
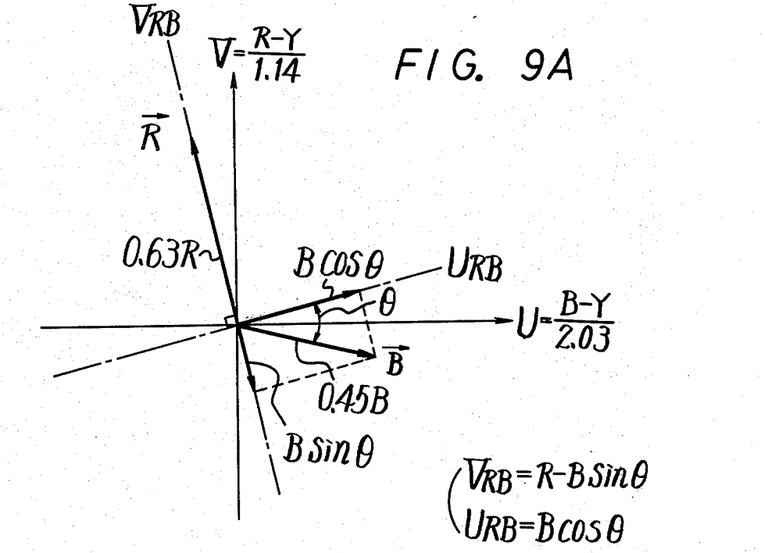
FIGS. 9A and 9B are block diagrams for explaining the invention.
Figure 9B:
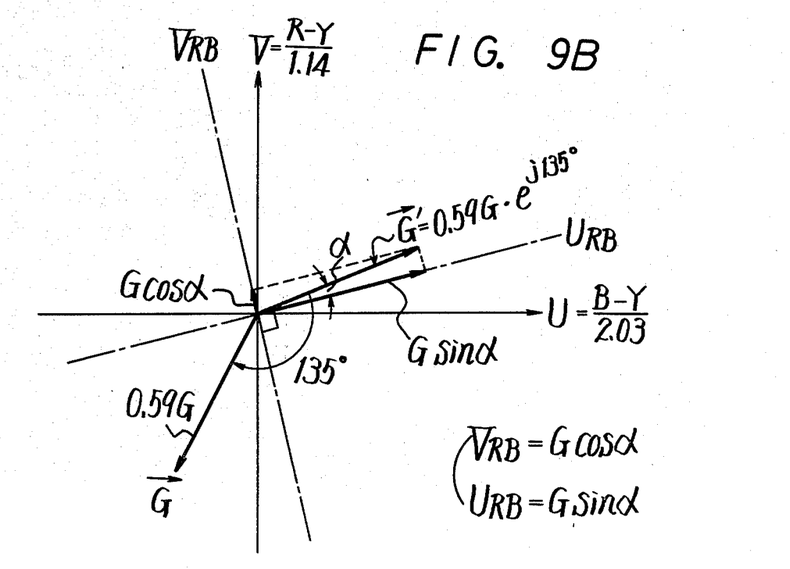

The input signal $C_G$ to the color modulator 41 which has only an amplitude component and no phase component is resolved into two components respectively on the $V_{RB}$ axis and on the $U_{RB}$ axis in a manner similar to that illustrated in FIG. 9A. For this case, the input signal $C_G$ provides video information which is advanced by $\tau/2$ pitch of a color element from the signals $C_R$ and $C_B$ delivered by the R and B chips as shown in FIG. 1 so that it is expressed as $\vec{G}'$ on the vector of FIG. 9B. Thus, the signal $\vec{G}'$ is shown at a position which is delayed by about 135° from the vector $\vec{G}$ of the actual green color signal. For this reason to produce the green color signal $\vec{C}_G$ corresponding to the actual green color vector $\vec{G}$ which is also actually subjected to a two-phase quadrature modulation, a delay time of $\tau H/2$ is necessary for $\vec{C}_R$ and $\vec{C}_B$. For this reason, as illustrated in FIG. 2, the delay line 105 having a delay time of τH/2 or $$\frac{1}{2} \cdot \frac{3}{4f_{sc}}$$

is connected following the mixer 43. For this case, the clock pulse CKB from the clock pulse generator 10 is supplied to the digital to analog converter 102 as well as to a phase shifter 101 where it is phase corrected by an amount for correcting the τ/2 pitch and the corrected pulse is fed to the digital to analog converter 104.

When producing the digital burst signal $S_B$ at the synchronizing signal generating signal 24, since the burst signal is opposite in phase relative to the U axis, the burst signal is resolved into a component on the R-axis and a component on the orthogonal axis and code words corresponding to the respective axes are stored in a memory. Thus, if the code words are selectively mixed at every $\frac{1}{4}f_{sc}$, a desired digital burst signal $S_B$ can be produced. In a practical case, a read-only memory is supplied with clock pulses of $f_{sc}$ and $2f_{sc}$, a burst flag pulse and a horizontal synchronizing pulse with these later pulses being in synchronism with the former pulses. Thus, these pulses logically operate to produce the desired digital burst signal $S_B$.

Figure 10A:
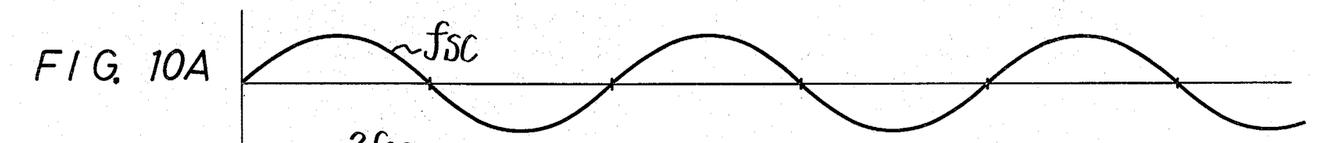
FIGS. 10A through 10F illustrate wave forms which are used for explaining the operation of the modulator of FIG. 8.
Figure 10B:
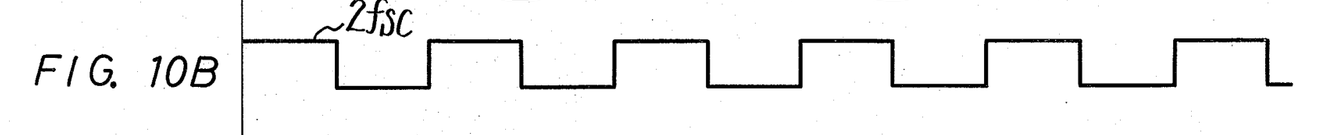
Figure 10C:
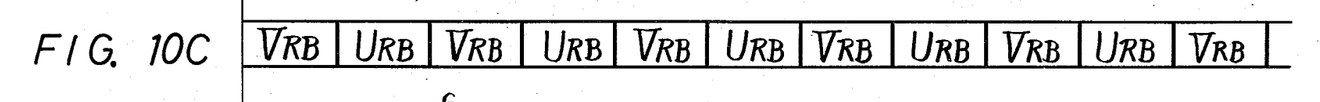
Figure 10D:
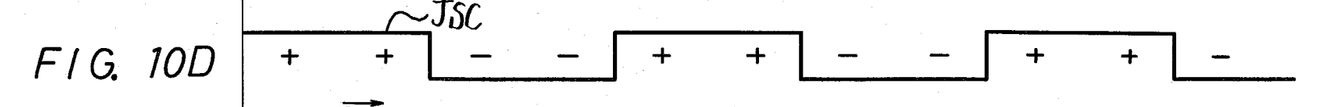
Figure 10E:
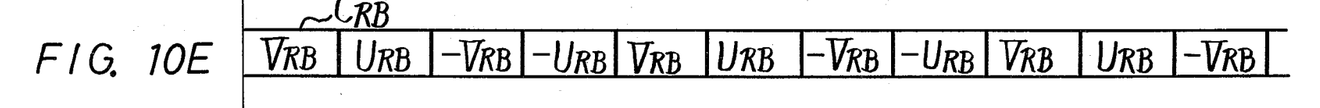
Figure 10F:
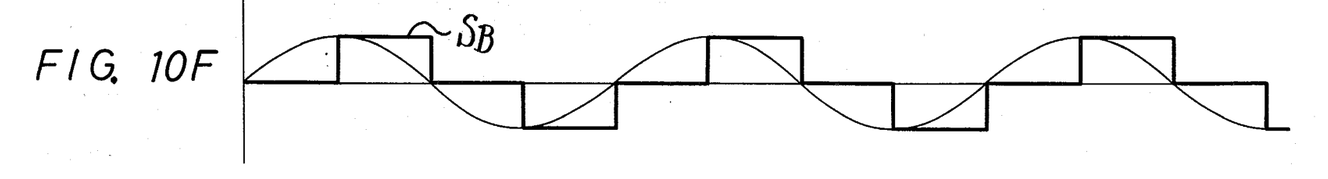

FIGS. 10A through 10F are plots of waveforms for explaining the operation of the modulator 21. FIG. 10A shows the phase of a subcarrier of a NTSC signal. FIG. 10B illustrates the wave form of the signal having a frequency of $2f_{sc}$ for switching the multiplexer 95. FIG. 10C shows components of an output signal of the multiplexer 95. The wave form of a signal of frequency $f_{sc}$ for switching the signal inverter 96 as shown in FIG. 10D and the output of the sign inverter 96 is illustrated in FIG. 10E. It can be observed from FIG. 10E that the output of the modulator 21 is a signal which has been subjected to two-phase quadrature modulation. FIG. 10F represents the phase of a digital burst signal which is fed to the mixer 25.

As described according to the present invention, the digital processing circuit system X from the CCD chip 1 (or 2) to the filter delay 6 (or 36) is processed at the sampling rate of $F_S=(4/3)f_{sc}$ of CCD chip 1 or 2, and the other digital processing circuit system Y following the circuit system X is processed at a rate of $F_{S'}=4f_{sc}$, so that the digital processing circuit system X which operates at low speed can be utilized and, thus, a digital circuit which is inexpensive can be utilized. Also, matching of the processing rates can be achieved by the digital to digital analog converter 20 which is relatively simple in construction and thus the circuit design can be simple and is suitable for integrated circuit construction.

In the above embodiment, the processing rate of the digital processing circuit system Y is $F_{S'}=4f_{sc}'$ but $F_{S'}=3f_{sc}$ can also be utilized. Also, in this embodiment, although a two-chip type television camera has been described, a single chip type or a three-chip type camera could also be used and in fact any type of television camera can be utilized. Additionally, the semiconductor image sensing device is applicable not only to television camera using charge coupled devices but also to those which use MOS type sensors.

Although the invention has been described with respect to preferred embodiments, it is not to be so limited as changes and modifications can be made which are within the full intended scope of the invention as defined by the appended claims.

We claim as our invention:

1. A solid state digital television camera having a solid state image sensing device from which dot sequential picture signals are obtained, said camera comprising:
   a. a solid state image sensing device (1, 2) for picking up a picture and producing electrical video signals, said device being driven at a first sampling rate,
   b. an A-D converter (3, 33) receiving the output of said solid state image sensing device (1, 2) and converting said picked-up video signals to digital video signals at said first sampling rate,
   c. a digital filter (6, 36) receiving the output of said A-D converter (3, 33) and filtering said digital video signals said filter driven at said first sampling rate,
   d. a digital color modulator (21, 41) receiving the output of said filter (6, 36) and modulating a subcarrier signal in the respective carrier phases with primary color components ($C_R$, $C_B$, $C_G$) which are produced from said filter individually, said modulator being driven at a second sampling rate;
   e. a D-A converter (102, 104) receiving the output of said digital color modulator (21, 41) and converting the outputs of said digital color modulator to analog video signals at said second sampling rate; and
   f. a D-D converter (20, 40) connected between said digital filter (6, 36) and said digital color modulator (21, 41) for converting the sampling rate of said primary color component signals from said first sampling rate to said second sampling rate and said second sampling rate is higher than said first sampling rate.

2. A solid state digital television camera having a solid state image sensing device from which dot sequential picture signals are obtained, said camera comprising:
   a. a solid state image sensing device (1, 2) for picking up a picture and producing electrical video signals,
   b. an A-D converter (3, 33) receiving the output of said solid state image sensing device (1, 2) and converting said picked-up video signals to digital video signals,
   c. a digital filter (6, 36) receiving and filtering said digital video signals from said A-D converter,
   d. a digital color modulator or encoder (21, 41) for modulating a subcarrier signal in the respective carrier phases with primary color components ($C_F$, $C_B$, $C_G$) produced from said filter individually,
   e. a D-A converter (102, 104) receiving and converting the outputs of said digital color modulator to analog video signals, and
   f. a D-D converter (20, 40) mounted between said digital filter and said digital color modulator for converting the outputs of said digital filter at a sampling drive rate of $(n/m) \cdot p \cdot f_{sc}$ to digital video signals having another sampling drive rate of $p \cdot f_{sc}$ where $f_{sc}$ is a color subcarrier, p is 3 or 4, and m and n are relatively small numbers, said A-D converter (3, 33) and said digital filter (6, 36) are driven at a sampling rate of $(n/m) \cdot p \cdot f_{sc}$, and said D-D converter (20, 40), digital modulator (21, 41) and said D-A converter (102, 104) are driven at a sampling rate of $p \cdot f_{sc}$.

3. A solid state digital television camera according to claim 2, wherein said digital filter (6, 36) is a two-dimensional spatial filter (7) operating as a vertical interpolator for the line alternating signal.

4. A solid state digital television camera according to claim 2, wherein said primary color components ($C_R$, $C_B$, $C_G$) are rate-converted to $4f_{sc}$ by said D-D converter with said numbers m being 3 and n being 1 and p is 4.

5. A solid state digital television camera according to claim 2, wherein said digital modulator is a phase balanced quadrature modulator operating by alternately multiplexing in-phase components ($V_{RB}$) and quadrature components ($U_{RB}$) every ¼ subcarrier period at the clock frequency $2f_{sc}$ and by alternately inverting the sign of said components every ½ subcarrier period at the clock frequency $f_{sc}$.

6. A solid state digital television camera according to claim 2, further comprising a gamma correction circuit (50) having a read-only memory operated at the sampling drive rate of $(n/m) \cdot p \cdot f_{sc}$.

7. A solid state digital television camera according to claim 2, wherein said image sensing device (1, 2) is composed of two sensing images, one for picking-up red and blue color signals and the other for picking-up green color signal.

8. A solid state television camera according to claim 2 wherein p is 4, n is 1 and m is 3.

* * * * *